Figure 1:
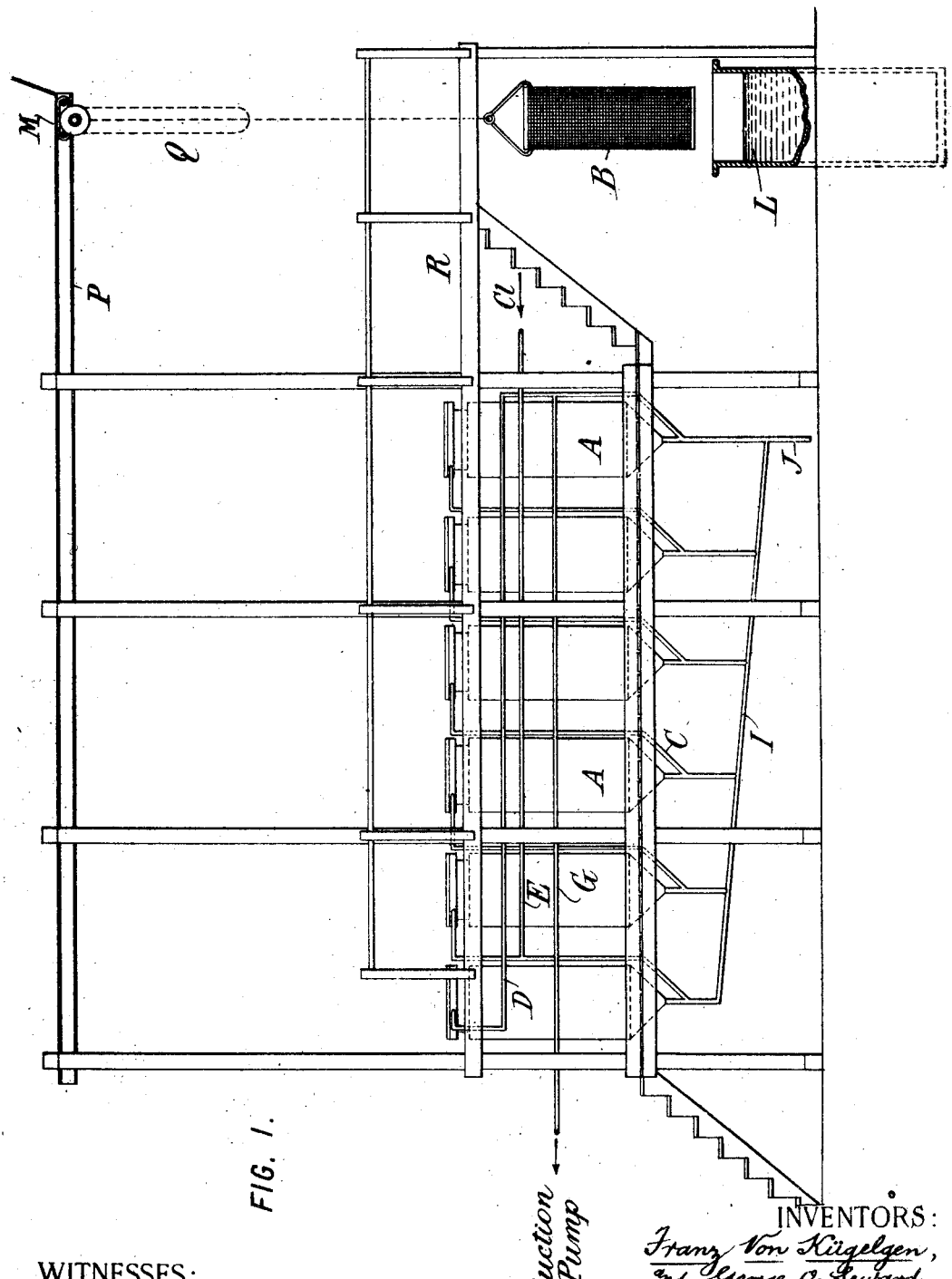

F. VON KÜGELGEN & G. O. SEWARD.
PROCESS OF DETINNING.
APPLICATION FILED APR. 22, 1909.

1,086,921.

Patented Feb. 10, 1914.

4 SHEETS—SHEET 1.

WITNESSES:
Fred White
Rene' Buine

INVENTORS:
Franz Von Kügelgen,
and George O. Seward,
By Attorneys,

F. VON KÜGELGEN & G. O. SEWARD.
PROCESS OF DETINNING.
APPLICATION FILED APR. 22, 1909.
1,086,921.
Patented Feb. 10, 1914.
4 SHEETS—SHEET 2.
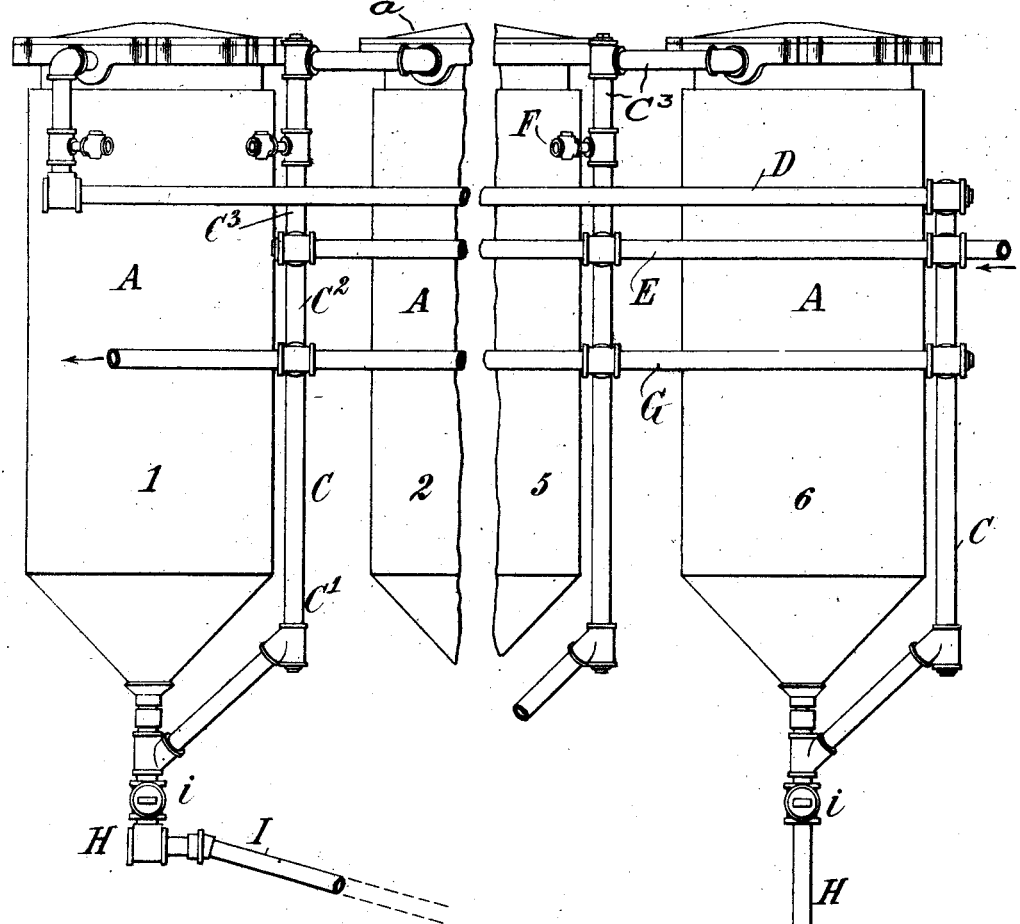
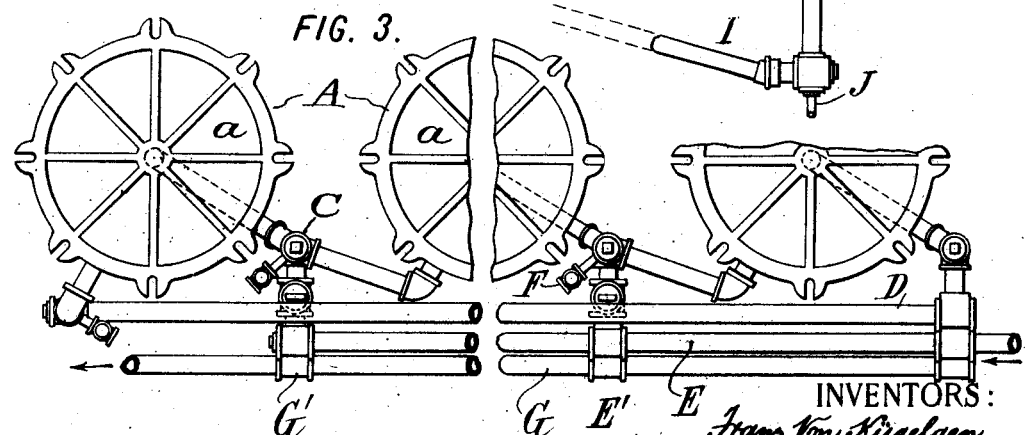
WITNESSES:
INVENTORS:

F. VON KÜGELGEN & G. O. SEWARD.
PROCESS OF DETINNING.
APPLICATION FILED APR. 22, 1909.

1,086,921.

Patented Feb. 10, 1914.
4 SHEETS—SHEET 3.

WITNESSES:
Fred White
René Buine

INVENTORS:
Franz Von Kügelgen,
George O. Seward,
By Attorneys,

F. VON KÜGELGEN & G. O. SEWARD.
PROCESS OF DETINNING.
APPLICATION FILED APR. 22, 1909.

1,086,921.

Patented Feb. 10, 1914.
4 SHEETS—SHEET 4.

WITNESSES:

INVENTORS:
Franz Von Kügelgen,
and George O. Seward,
By Attorneys,

UNITED STATES PATENT OFFICE.

FRANZ VON KÜGELGEN, OF HOLCOMBS ROCK, VIRGINIA, AND GEORGE O. SEWARD, OF EAST ORANGE, NEW JERSEY, ASSIGNORS, BY MESNE ASSIGNMENTS, TO COLUMBIA-KNICKERBOCKER TRUST COMPANY, TRUSTEE, A CORPORATION OF NEW YORK.

PROCESS OF DETINNING.

1,086,921.  Specification of Letters Patent.  Patented Feb. 10, 1914.

Application filed April 22, 1909. Serial No. 491,529.

*To all whom it may concern:*

Be it known that we, FRANZ VON KÜGELGEN, a subject of the German Emperor, residing at Holcombs Rock, in the county of Bedford and State of Virginia, and GEORGE O. SEWARD, a citizen of the United States, residing at East Orange, in the county of Essex and State of New Jersey, have jointly invented certain new and useful Improvements in Processes of Detinning, of which the following is a specification.

This invention relates to the detinning of tin scrap or other tin bearing material by treating it in a closed tank with dry chlorin gas, the operation being conducted at a temperature sufficiently low to prevent the iron of the scrap being attacked by the chlorin. This process is set forth and claimed in our application Serial No. 189,272, filed January 16, 1904 (being Letters Patent No. 915,029, granted March 9, 1909).

In practising this process it is not necessary or essential that the chlorin gas shall be of full strength, it being admissible to use it with a considerable admixture of air, this being the usual condition of the chlorin as obtained from the cheapest available source, namely, the electrolytic tanks or cells in which any chlorin, such as common salt, is being electrolyzed.

The process is preferably practised in a manner set forth in Letters Patent No. 853,461, granted May 14, 1907, that is to say, by first passing dry chlorin through the detinning vessel or tank while suitably controlling the temperature; then removing the stannic chlorid which adheres to the residual iron scrap by passing dry chlorin through the vessel for a sufficient time; and finally displacing the chlorin from the vessel by passing a current of dry air or other inert gas (such as nitrogen) through the vessel. After this last operation has continued long enough to remove all but a trace of chlorin, the vessel may be safely opened for the removal of the detinned iron or "black scrap," and for recharging it with tin scrap.

According to our present invention we render the process practically continuous by employing a series of tanks or vessels which are connected to form a circuit and are operated in succession. The operation is divided up into suitable units of time, say for example of one hour or more each, depending upon the size of the tanks, the amount of tin scrap therein, the strength of the chlorin, and the rate of flow of the chlorin. During each time-unit one of the tanks will ordinarily be cut out of the series, being opened for the removal of the iron scrap and the recharging with tin scrap to be detinned. The remaining tanks are so connected that air is being admitted to the one which has been longest charged and the scrap in which has been completely detinned; the next tank in the series receives fresh dry chlorin gas together with the air passing from the preceding tank and carrying the chlorin which it has displaced therefrom; in each successive tank the mixture of chlorin and air encounters a fresher or newer charge of tin scrap with the tin on which the chlorin combines to form stannic chlorid, until in the last tank of the series the chlorin has all or practically all been removed from the air, whereupon the air which remains is drawn out by any suitable suction device such as a pump or ejector. Thus the tank which is most newly charged with tin scrap is traversed first by air containing only a small residue of chlorin, which if the process is ideally conducted is wholly eliminated in this tank by reacting with the tin on the scrap therein; at the end of the prescribed time-unit this tank is advanced one step in the series, and consequently receives a current of air containing a larger proportion of chlorin, whereby the reaction between the chlorin and tin proceeds more rapidly; at the end of each time-unit the serial position of the tank is thus advanced, so that after a suitable interval (depending upon the number of tanks in the series) the tank in question is receiving chlorin at such strength that the maximum rapidity of reaction is attained; the next serial advance of the tank will or may occur after the detinning operation therein has been wholly or substantially completed, so that while it is receiving the mixture most rich in chlorin the effect of the latter is wholly or chiefly to take up by evaporation such residue of stannic chlorid as remains adhering to the iron scrap, the treatment during this time-limit continuing sufficiently long to take up practically all of such residual chlorid; at the next serial change the admission of chlorin is cut off from the tank in question and shifted to the next following tank, so that the tank in question receives only a current of air (or any inert gas) which displaces the chlorin remaining in the interstices of the scrap, and thereby eliminates practically all residual chlorin from the tank; at the next serial change the air admission is cut off and the tank is thus thrown out of the circuit, so that it may be opened to remove the detinned iron scrap and recharge it with tin scrap. To facilitate these last operations the scrap is best placed in a wire or other foraminous cage or grating which can be conveniently lowered into or lifted out of the open top of the tank.

The tanks may be of varying number, depending upon the precise method in which the successive operations are to be conducted. For the preferable succession of operations as just described there should be at least four tanks in order to provide for simultaneously (1) detinning (2) absorbing chlorid (3) displacing chlorin with air, and (4) removing the scrap and recharging. But the number of tanks might be further diminished by sub-dividing the given time-unit so that for example operations Nos. (3) and (4) might be performed successively in the same tank during a given time-unit. Or the sequence of operations and the time-interval allotted to each might be otherwise varied accompanied by a corresponding variation in the number of the tanks and in the manipulation of their connections.

Figure 4:
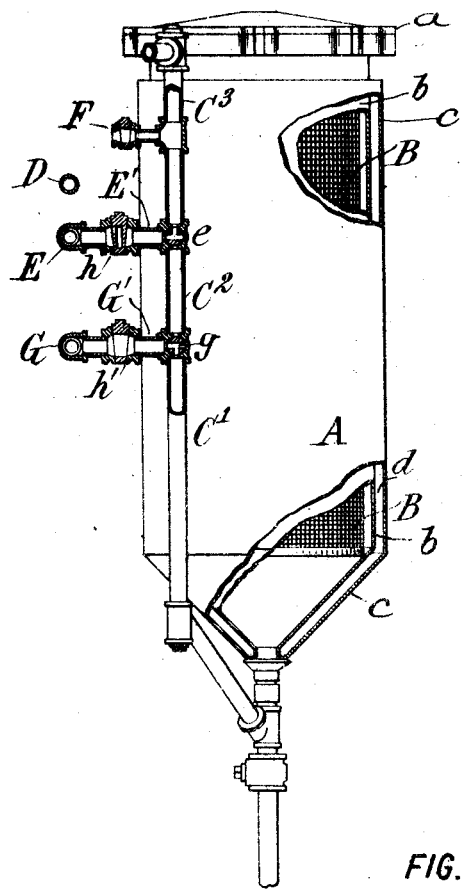
Figure 5:
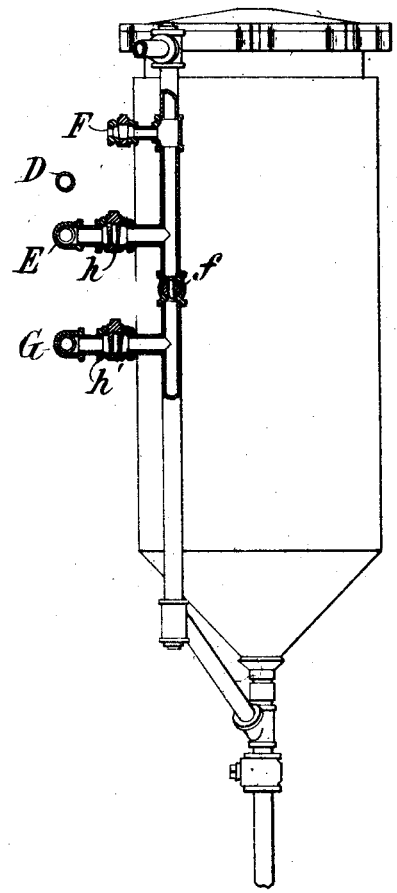
Figure 8:
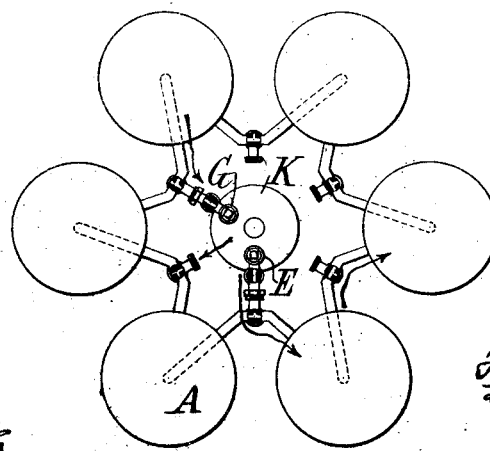
Figure 6:
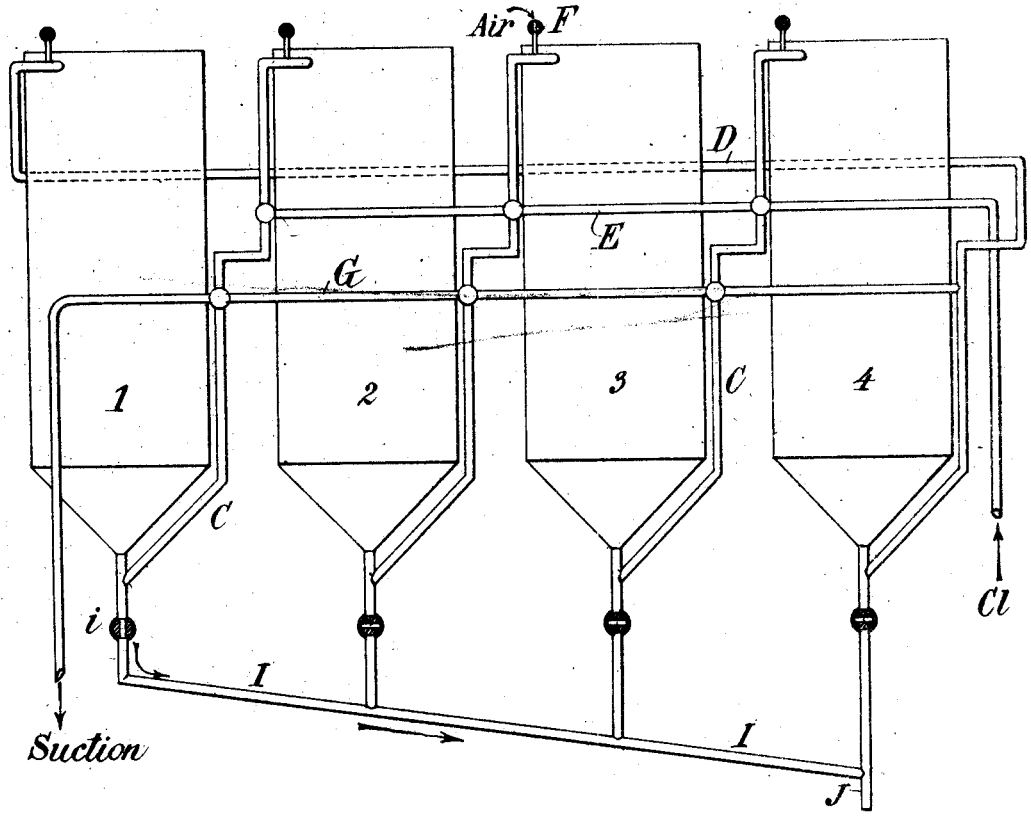
Figure 7:
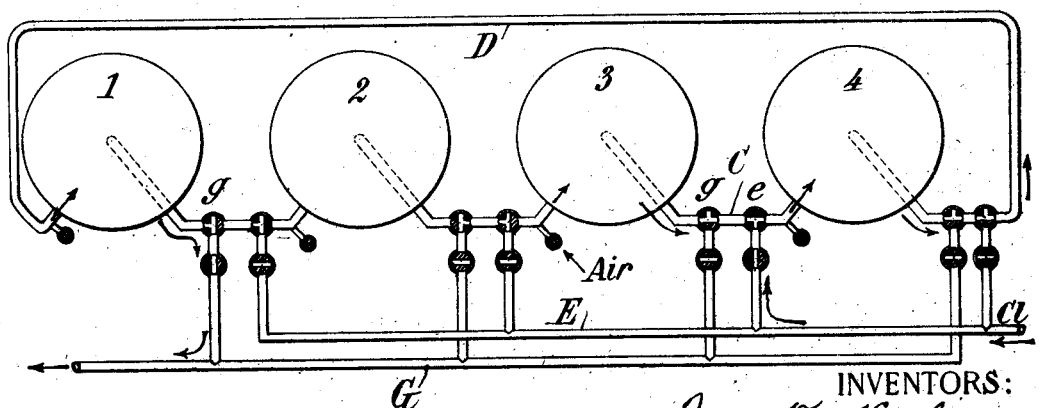

Figure 1 of the accompanying drawings is an elevation of an apparatus comprising a battery of six tanks or vessels. These are shown on a small scale and by reason thereof no attempt is made to show the valves or other smaller details. Fig. 2 is an elevation showing the terminal tanks and parts of two intermediate tanks, with their connecting pipes and valves. Fig. 3 is a plan of the apparatus shown in Fig. 2. Figs. 4 and 5 are vertical cross sections between the tanks; in Fig. 4 the tank is partly in section. Fig. 6 is a diagrammatical elevation showing a battery of four tanks. Fig. 7 is a diagrammatical plan of the tanks shown in Fig. 6. Fig. 8 is a plan of a modified arrangement.

Referring to the drawings let A A designate the respective tanks or detinning vessels, which are also consecutively numbered as 1, 2, 3, etc. These tanks are here shown as upright cylindrical vessels with conical bottoms to facilitate draining off the liquid chlorid and with removable tops or lids $a$ to facilitate introducing and removing the cage B containing the scrap. The tanks are water jacketed to facilitate cooling them in case the heat of the reaction becomes excessive. The construction is shown in Fig. 4 where the tank is partly broken away to show the construction in vertical section. In this figure $b$ is the inner shell constituting the wall of the tank proper and $c$ is the outer shell forming between them the water jacket $d$. The connections for admitting water to and discharging it from the jackets are not shown, being well understood.

The several tanks are connected in a series by means of suitable pipes which are provided with valves or stop-cocks for controlling the flow. Ideally the tanks would be arranged in a circular series, each connecting to the next in an essentially endless arrangement; but in most situations it is more convenient to place the tanks in a straight row, and this is the arrangement shown in Figs. 1 to 5. This arrangement, however, involves a somewhat more complicated arrangement of piping than would be required for the supposed circular series.

A pipe C leads from the bottom of each tank to the top of the next tank in the series. These pipes make as direct a communication as possible but in the case of the last tank in the series (No. 6) the connection is completed through a horizontal return pipe D which leads to the top-inlet of the first tank (No. 1). Two other horizontal pipes are provided, namely, a chlorin inlet pipe E and an outlet or suction pipe G. The pipes E and G, where they cross the vertical pipes C C, connect with them through horizontal branches E' E' and G' G' respectively. Each of the pipes C C consists essentially of three parts, namely, a portion $C^1$ extending from the bottom of one tank up as far as its connection with the branch pipe G; an intermediate portion $C^2$ between the branch pipe G' and E'; and an upper portion $C^3$ leading from the pipe E' to the top of the next tank. Various arrangements of cocks or valves may be provided for suitably controlling the flow through these pipes, it being only necessary that provision be made for admitting the chlorin from the pipe E to the upper section $C^3$ of one of the connecting pipes, while cutting it off from the lower sections of such pipe, and for connecting the suction pipe G to any one of the lower sections $C^1$, while cutting it off from the upper section, and for connecting together the three sections of any of the pipes C while cutting such pipe off from the pipes E and G. In addition each tank is provided with an air-inlet valve F, which is most conveniently connected with a lateral branch joining the upper section $C^3$ of each of the connecting pipes C.

The valves and pipe connections are most clearly indicated in Fig. 4. In this view three-way cocks $e$ $g$ are shown at the junctions of the riser pipe C with the horizontal branch pipes E' and G'. These cocks e g may be turned to provide a direct upward passage through the respective sections of the pipe C, while cutting off communication with the horizontal branch pipes; or, they may as shown be turned so that the intermediate section C² is cut off from communication from the upper and lower sections, the branch pipe E' being connected through the cock e with the upper section C³; and the branch pipe G' being connected through the cock g with the lower section C¹. In addition we have shown stop-cocks h h' in the respective branch pipes E' and G', but these are not essential, although constituting a desirable precaution. An alternative arrangement of valves is shown in Fig. 5, where instead of the three-way cocks three ordinary stop-cocks are used, namely, the cocks h h' already referred to and a cock f in the pipe section C²; by a suitable adjustment of these three cocks provision may be made for the same control of the flow as in Fig. 4.

From the bottom of each tank leads a drip pipe H controlled by a suitable valve or cock i. The purpose of the pipe H is to drain off the liquid stannic chlorid which collects in the bottom of the tank. The pipe H might be entirely distinct from the pipe C, but for convenience a single pipe is used for both at the outlet from the tank, the pipe section C¹ branching therefrom upwardly while the main pipe H extends downwardly. The several pipes H H are preferably connected all to one chlorid outlet by means of inclined drainage pipes I I. From the lowest point the chlorid outlet pipe J leads down to discharge into any suitable chlorid collecting vessel.

The operation may be best understood from the diagrams, Figs. 6 and 7, which show a battery of four tanks. In these figures in order to simplify the diagrams the return pipe D is shown as carried behind the series of tanks. The several pipes and valves or cocks are shown as having the same letters as in the preceding figures, but to enable the relations of the valves to be clearly seen they are in Fig. 7 placed side by side, the three-way cocks e g being drawn as though located in horizontal portions of the pipes C. In these diagrams, and with the particular adjustment of valves shown, tank No. 2 is cut out of series for recharging; air is entering through valve F into the top of tank No. 3 to displace the remaining chlorin therefrom; the air circulates downwardly through this tank and up through its pipe C to enter the top of tank No. 4; at the same time chlorin is introduced through pipe E into the same connecting pipe C, between tanks Nos. 3 and 4, commingling with the air at the three-way cock e thereof. The mixed air and chlorin pass down through tank No. 4, which contains detinned scrap, and the chlorin absorbs the stannic chlorid adhering thereto, thereby drying the scrap; the mixed chlorin and air, carrying stannic chlorid vapor, then pass from the bottom of tank No. 4 to the next tank in the series, which in the arrangement shown is tank No. 1. To reach this tank they pass around through the connection pipe D. On entering tank No. 1 the chlorin encounters undetinned scrap and proceeds to react with the tin thereon to form stannic chlorid. By suitably limiting the rate of admission of chlorin, considering the extent of its dilution with air, and by suitably cooling the vessel by circulation of water or other cooling fluid through the water jacket, the temperature is kept down below the point at which the chlorin would attack the iron of the scrap. If any stannic chlorid is volatilized by the heat, it is condensed within the vessel upon reaching cooler surfaces therein, either the surfaces of cooler portions of the scrap, where the reaction has not yet proceeded so far as to heat them above the boiling point of $SnCl_4$, or the cooled walls of the vessel. The stannic chlorid which drains from the scraps runs out through the bottom outlet and the valve i being open it passes out through the pipe H, and runs off through the pipe I to the chlorid vessel. If the series included a larger number of tanks, the air carrying a small residue of chlorin and air would pass thence through one or more additional tanks, containing fresh tin scrap, whereby the last residue of chlorin would be taken up by its reaction with the tin. But with the series of only four vessels shown in Figs. 6 and 7, the chlorin from tank No. 1 passes directly through pipe section C¹ to the valve g and thence c t through the pipe G to the suction.

At the end of the prescribed time-unit, the tank No. 2 having been recharged with fresh scrap and closed, the several valves are turned so as to isolate tank No. 3 from the active series, the air being then introduced first to tank No. 4, and the chlorin to tank No. 1, in which the detinning operation is mainly conducted. Tank No. 3 is then opened, the detinned iron scrap is removed therefrom, and it is recharged with fresh tin scrap. Thus the operation proceeds, one tank after another being emptied and recharged, and the successive operations being each time advanced from one tank to the next.

It is preferable to employ tanks enough so that the fresh tin scrap will first be traversed by the nearly spent or most dilute chlorin, in order to take up the last portion thereof, and discharge only air to the suction; and so that in each succeeding stage of the process this tank will be traversed by successively stronger chlorin until its scrap shall be completely detinned; after which it continues to receive the strongest chlorin long enough to absorb substantially all the stannic chlorid and thoroughly dry the scrap; and after this it is traversed by a current of air for a sufficient time to displace substantially all the remaining chlorin, in order that when the tank is opened there shall be no waste of chlorin, and the operatives shall not be subjected to the risk of inhaling the suffocating fumes of either chlorin or stannic chlorid vapor.

The process and apparatus may be considerably modified within the limits of our invention. Such modifications will be apparent to mechanics and engineers constructing detinning apparatus for carrying out our process. As one example of such a modification we show in Fig. 8 a plan of a circular series of tanks, their connecting pipes being shown in diagram in similar manner to Fig. 7. But instead of the pipes E and G being horizontal pipes traversing the series with a multiplicity of branches, they are here shown as upright pipes mounted upon a central turn table K and having each one branch, so that by turning the turn table they can be swung to any desired position so that their branches will connect with the desired branches communicating with the connecting pipes C C between the tanks. Thus the chlorin enters through pipe E, is conducted through its branch pipe to the coinciding branch leading into the tank which is first to receive the chlorin; and from the last tank in the series the residual air passes into the branch connecting with the suction pipe G. The branch pipes projecting from the pipes E and G are provided with couplings which enable them to be united to the ends of the respective stationary branch pipes. By placing the branches of pipes E and G in different horizontal planes, the liability of any mistake in making connections may be eliminated.

It is desirable to provide the apparatus with means for facilitating the subsequent washing of the detinned scrap. The detinning operation leaves upon the iron scrap a very thin coating of ferric chlorid, believed to be due to the union of the chlorin with so much of the iron as had formed a superficial or intermediate alloy with the tin beneath the coating proper thereof. If this adherent ferric chlorid were left, it would cause a rapid rusting of the iron, which would detract from its value for remelting. It is therefore important to wash off this iron chlorid, which is easily done, since this chlorid is readily soluble in water. For this purpose we provide a separate washing tank or vat L shown in Fig. 1 which is uncovered and preferably arranged lower than the other tanks. We also provide some convenient means for lifting the cage B out of any of the tanks A, and conveying it to the tank L, and lowering it into the wash-water therein. In the construction shown in Fig. 1 this means consists of a trolley M running upon an overhead track P, and carrying any suitable sort of windlass or hoisting gear Q for lifting and lowering the cage. For convenience an elevated platform R is arranged in front of the row of tanks.

We are aware that in early efforts to detin by chlorin gas, but without any regulation of temperature, it was proposed to employ two detinning tanks, charging them in alternation, and passing the spent gas and vapors from one into the other by forcing air into the tank containing the detinned scrap and thereby displacing the residual chlorin and the stannic chlorid existing as vapor into the other or newly charged tank. Our process differs from any heretofore proposed in that we employ sufficient tanks to constitute a series through which the chlorin and air are circulated continuously in such manner as to admit of a constant inflow of chlorin and a constant outflow of air to the suction device. We are thus enabled to conveniently utilize electrolytically produced chlorin which is taken directly from the electrolytic cells, and so continuously as to avoid necessity for storing any material bulk of the gas.

We usually prefer the use of suction for circulating the chlorin and air, especially when drawing the chlorin from electrolytic cells, but in some instances it may be preferable to employ pressure to force the chlorin through. For example, we have successfully practised our invention by using liquefied chlorin admitted at a suitable rate from a flask or vessel containing it, so that the pressure thus applied to the chlorin forced it to circulate through the pipes. In such case it is necessary to apply means for introducing air under pressure at the valve F.

Our invention is to be distinguished from the use of two detinning tanks into which the tin scrap and chlorin are introduced in alternation; and is to be distinguished from those processes in which chlorin is circulated through tin scrap without any provision for suitably controlling the temperature.

We claim as our invention:

1. The process of detinning which consists in circulating dry chlorin gas through a succession of tanks containing tin scrap in varying stages of detinning, while controlling the temperature to keep it below that at which the iron is attacked.

2. The process of detinning which consists in circulating dry chlorin gas through a succession of tanks containing tin scrap in varying stages of detinning, passing the gas first through the tank containing the scrap which is most nearly detinned, and thence through tanks containing successively fresher scrap, while controlling the temperature to keep below that at which the iron is attacked.

3. The process of detinning which consists in circulating a mixture of dry chlorin gas and an inert gas (as air), through a succession of tanks containing tin scrap in varying stages of detinning, while controlling the temperature to keep it below that at which the iron is attacked.

4. The process of detinning which consists in circulating a mixture of dry chlorin gas and an inert gas (as air), through a succession of tanks containing tin scrap in varying stages of detinning, passing the gaseous mixture first through the tank containing the scrap which is most nearly detinned, and thence through tanks containing successively fresher scrap, and finally drawing off the residual inert gas.

5. The process of detinning which consists in circulating dry chlorin gas through a succession of tanks containing tin scrap in varying stages of detinning, so that a freshly charged tank receives first the spent or attenuated chlorin from preceding tanks, and receives subsequently stronger chlorin until the detinning is completed, and finally passing an inert gas through the tank containing the detinned scrap.

6. The process of detinning which consists in circulating a mixture of dry chlorin gas and an inert gas (as air) through a succession of tanks containing tin scrap in varying stages of detinning, and passing such inert gas through the tank containing the detinned scrap to displace the chlorin therefrom, admitting fresh chlorin to mix with the inert gas passing from said tank, and passing such mixture thence into the next tank of the series.

7. The process of detinning which consists in circulating a mixture of chlorin gas and an inert gas (as air) through a succession of tanks containing tin scrap in varying stages of detinning, by introducing such inert gas to the tank containing the detinned scrap, and admitting fresh chlorin to a subsequent tank, the inert gas admixing therewith and being circulated serially through the successive tanks.

8. The process of detinning by circulating chlorin gas through a succession of tanks containing tin scrap in varying stages of detinning, which consists in introducing an inert gas (as air) into the tank containing detinned scrap, and circulating it thence through the series of tanks, while introducing the chlorin to a subsequent tank in the series, whereby it forms a mixture with the inert gas, and circulates therewith until the chlorin is removed therefrom by combining with the tin.

9. The process of detinning by circulating chlorin gas through a succession of tanks containing tin scrap in varying stages of detinning, which consists in introducing an inert gas (as air) into the tank containing the detinned scrap, and introducing the strongest chlorin into a subsequent tank also containing detinned scrap, mixing said gases and circulating them through the subsequent tanks containing fresher charges of tin scrap until the chlorin is removed by combining with the tin.

10. The process of detinning which consists in circulating a mixture of dry chlorin gas and an inert gas (as air) through a succession of tanks containing tin scrap in varying stages of detinning, conducting the reaction at such temperature as to retain in the tanks in liquid form the resulting stannic chlorid, and drawing off such liquid from the bottoms of the tanks.

11. The process of detinning by circulating chlorin gas through a succession of tanks containing tin scrap in varying stages of detinning, which consists in coupling said tanks in series except for one tank which is isolated from such series, opening said tank, removing the detinned scrap, recharging with fresh scrap and again closing it while the detinning operation is proceeding in the remaining tanks, then coupling the newly charged tank into the series and isolating therefrom the next succeeding tank for recharging, applying a suction each time to the outlet of the newly charged tank, admitting air to the tank longest charged with scrap, and admitting chlorin to a subsequent tank so that the chlorin and air may mix and be drawn together through the series of tanks.

12. The method of detinning tin-scrap, which consists in establishing a series of separate charges to be treated, starting the operation in the first charge by the admission of chlorin gas diluted with air, decreasing the air dilution of the gas thus admitted as the detinning in said charge progresses, passing the gases from the first charge successively through the other charges of the series as the detinning in the first charge proceeds, and finally passing the residual gases left after the completion of the detinning operation in the first of the charges utilizing charge into one of the charges utilizing dilute chlorin, substantially as described.

13. The method of detinning tin scrap, which consists in establishing a series of separate charges to be treated, starting the operation in the first charge by the admission of chlorin gas diluted with air, decreasing the air dilution of the gas thus admitted as the detinning in said charge progresses, passing the gases from the first charge successively through the other charges of the series as the detinning in the first charge proceeds, finishing the detinning of the first charge by concentrated chlorin, and finally passing the residual gases left after the completion of the detinning operation in the first charge into one of the charges utilizing dilute chlorin, substantially as described.

14. The method of detinning tin scrap, which consists in establishing a series of separate charges to be treated, starting the operation in the first charge by the admission of chlorin gas diluted with air; decreasing the air dilution of the gas thus admitted as the detinning in said charge progresses, passing the gases from the first charge successively through the other charges of the series as the detinning in the first charge proceeds, and finally passing, by means of a diluting current of warm, dry air, the residual gases left after the completion of the detinning operation in the first charge into one of the charges utilizing dilute chlorin, substantially as described.

In witness whereof, we have hereunto signed our names in the presence of two subscribing witnesses.

FRANZ von KÜGELGEN.
GEORGE O. SEWARD.

Witnesses:
ALBERT VAN WAIKLE,
M. K. BARTELS.